(12) United States Patent
Ferdinand et al.

(10) Patent No.: US 11,502,890 B2
(45) Date of Patent: *Nov. 15, 2022

(54) SYSTEM AND METHOD FOR TRANSMITTING AND RECEIVING SINGLE-CARRIER OQAM SYMBOLS

(71) Applicants: Nuwan Suresh Ferdinand, Stittsville (CA); Ming Jia, Ottawa (CA)

(72) Inventors: Nuwan Suresh Ferdinand, Stittsville (CA); Ming Jia, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/181,047

(22) Filed: Feb. 22, 2021

(65) Prior Publication Data
US 2021/0176108 A1 Jun. 10, 2021

Related U.S. Application Data

(63) Continuation of application No. 16/567,122, filed on Sep. 11, 2019, now Pat. No. 10,931,493.

(51) Int. Cl.
*H04L 27/26* (2006.01)
*H04L 5/00* (2006.01)
*H04L 27/34* (2006.01)

(52) U.S. Cl.
CPC ........ *H04L 27/2636* (2013.01); *H04L 5/0007* (2013.01); *H04L 27/2698* (2013.01); *H04L 27/3411* (2013.01)

(58) Field of Classification Search
CPC .............. H04L 27/2636; H04L 27/2698; H04L 27/3411; H04L 5/0007

(Continued)

(56) References Cited

U.S. PATENT DOCUMENTS 9,236,981 B2 * 1/2016 Gaspar ................ H04L 27/2662
2016/0112238 A1   4/2016 Ling et al.
2017/0331663 A1 * 11/2017 Moradi ............... H04L 27/3494

FOREIGN PATENT DOCUMENTS

CN   107426129 A   12/2017
CN   107911330 A    4/2018
(Continued)

OTHER PUBLICATIONS

MCC Support, "Final Report of 3GPP TSG RAN WG1 #88bis v1.0.0, (Spokane, USA, Apr. 3-7, 2017)", 3GPP TSG RAN WG1 Meeting #89, R1-1708890, Hangzhou, China, May 15-19, 2017.

(Continued)

*Primary Examiner* — Ted M Wang

(57) ABSTRACT

A system and method are provided for processing symbols for transmission. The method involves producing a single carrier offset quadrature amplitude modulation (OQAM) waveform signal from a set of K complex symbols. The method further involves pulse shaping 2K frequency domain samples of the OQAM waveform signal with J non-zero coefficients, where the J non-zero coefficients represent a frequency response of a conjugate symmetrical pulse shape, and $K \leq J \leq 2K-1$. The approach has the advantage of avoiding self-interference, with the result that better BLER performance may be possible. The approach is applicable to any modulation order and also avoids bandwidth expansion. Flexibility is provided through a trade-off between PAPR vs. spectrum efficiency.

21 Claims, 9 Drawing Sheets

(58) Field of Classification Search
USPC .......................................................... 375/262
See application file for complete search history.

(56) References Cited

FOREIGN PATENT DOCUMENTS

WO    2017197270 A1    11/2017
WO    2018031246 A1    2/2018

OTHER PUBLICATIONS

Huawei, HiSilicon, "Discussion on further PAPR reduction for uplink DFT-S-OFDM", 3GPP TSG RAN WG1 NR Ad Hoc Meeting, R1-1700077, Spokane, USA, Jan. 16-20, 2017.
Huawei, HiSilicon, "Performance evaluation for pi/2 BPSK with FDSS", 3GPP TSG RAN WG1 Meeting #88bis, R1-1705060, Spokane, USA, Apr. 3-7, 2017.
Samsung, "On transparency of spectrum shaping for $\pi/2$-BPSK DFT-s-OFDM", 3GPP TSG RAN WG1 Meeting #90, R1-1714488, Prague, Czechia Aug. 21-25, 2017.
R1-1701725, Huawei et al., Discussion on further PAPR reduction for DFT-S-OFDM, 3GPP TSG RAN WGI #88, Athens, Greece, Feb. 13-17, 2017, 6 pages.

\* cited by examiner

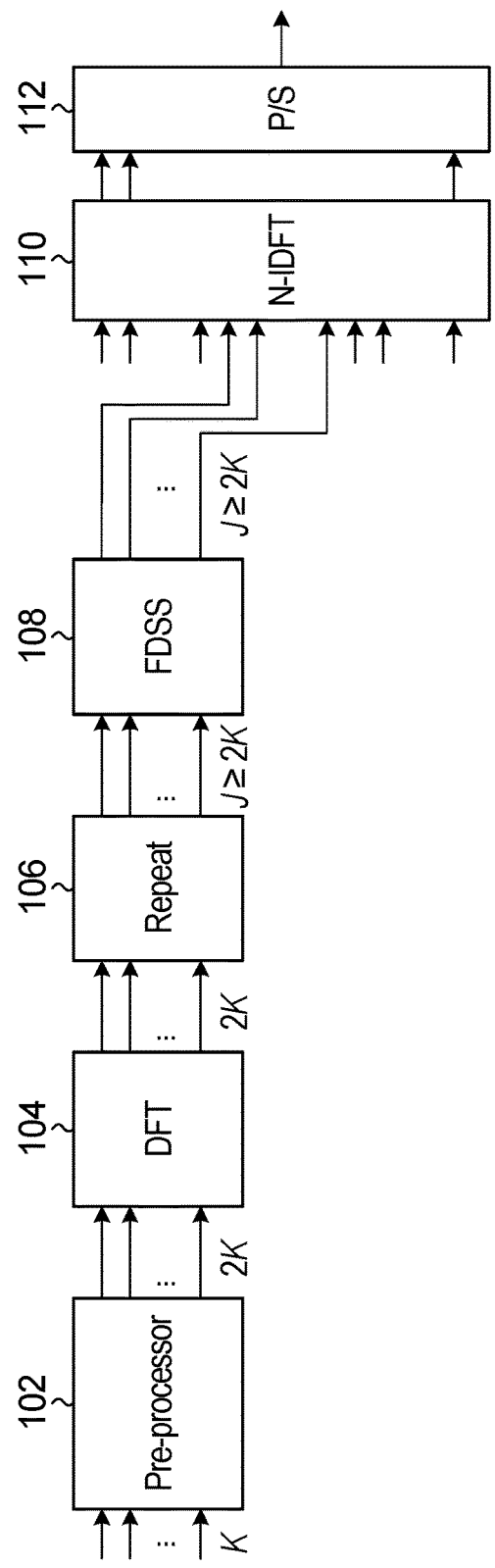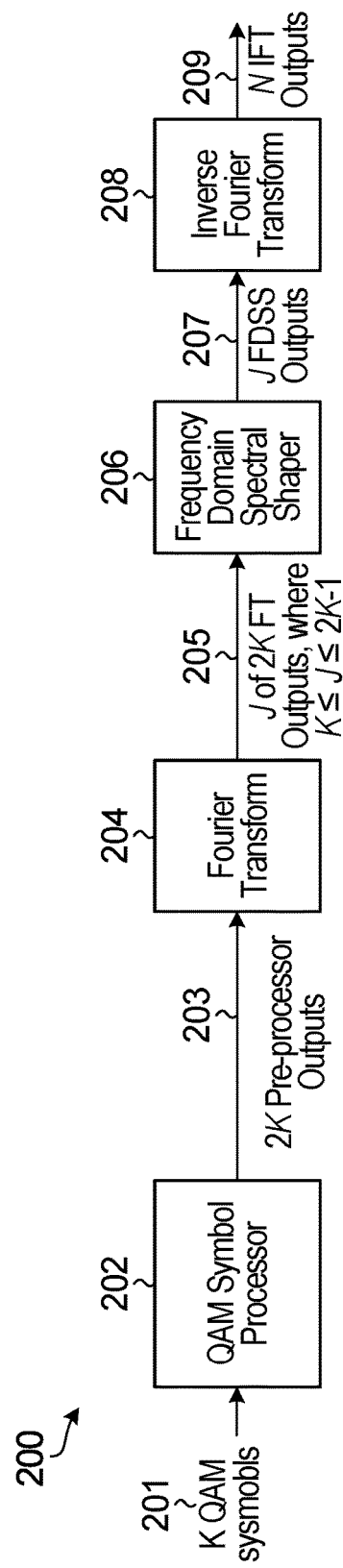
FIG. 1
FIG. 2A

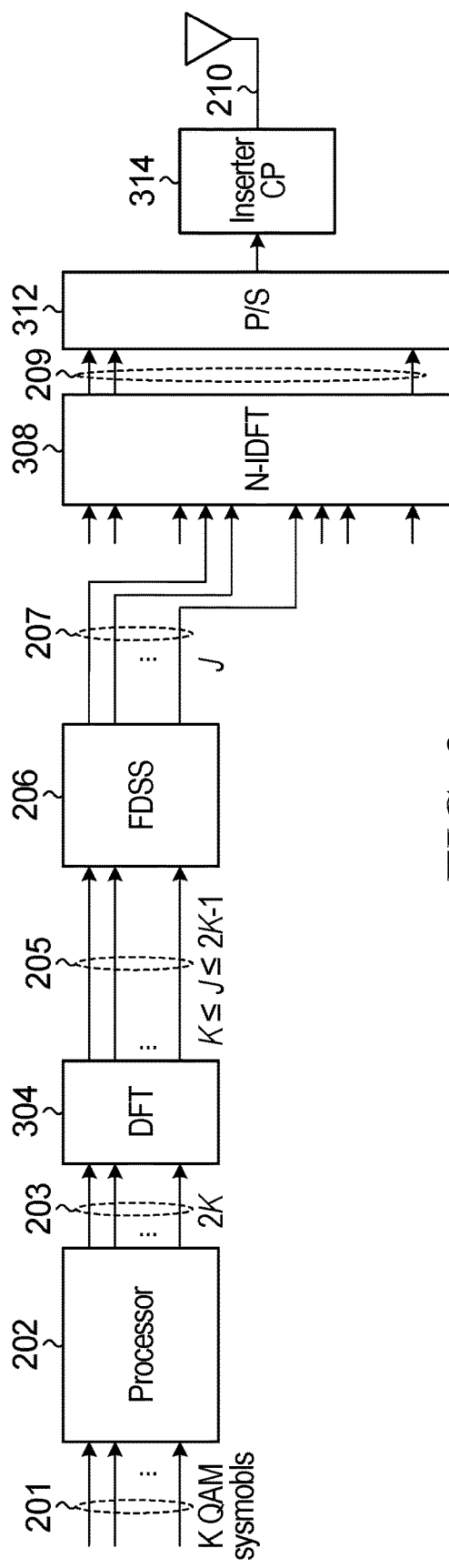
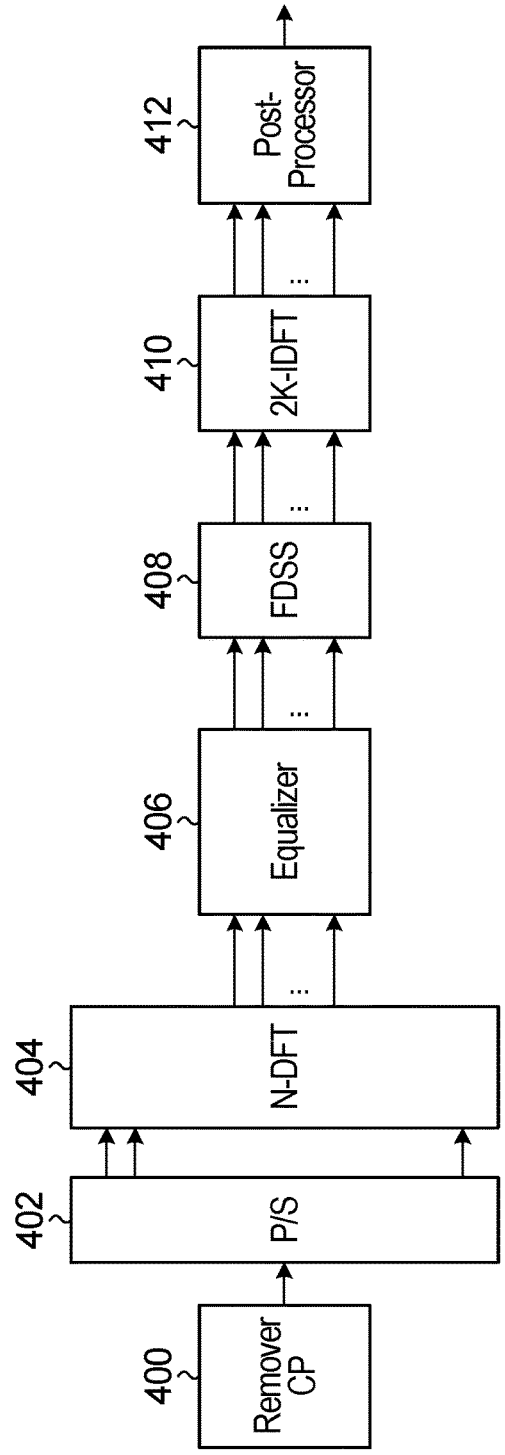
FIG. 3
FIG. 4

SYSTEM AND METHOD FOR TRANSMITTING AND RECEIVING SINGLE-CARRIER OQAM SYMBOLS

This application is a continuation of U.S. patent application Ser. No. 16/567,122 filed Sep. 11, 2019, entitled "System and Method For Transmitting and Receiving Single-Carrier OQAM Symbols", the contents of which is incorporated by reference herein in its entirety.

FIELD

The present invention relates generally to digital communications, and more particularly to a method and apparatus for transmitting single-carrier offset quadrature amplitude modulation (OQAM) symbols using frequency domain spectral spacing (FDSS).

BACKGROUND

Peak to Average Power Ratio (PAPR) is a signal characteristic used to describe the efficiency of power amplifiers. As power-limited communication devices use power amplifiers in the transmission of a signal, the impact of the PAPR becomes significant; as a result, it is especially beneficial to reduce the PAPR of signal waveforms used for transmissions from a power-limited device, such as uplink and sidelink transmissions in a wireless communication system.

Orthogonal Frequency Division Multiplexing (OFDM) is a method of modulating digital signal data, in which a single data stream is split across several subcarrier frequencies to reduce interference and cross talk. This waveform is found in the downlink of the Long Term Evolution (LTE) wireless standard. However, the standard OFDM waveform has a relatively large PAPR, wherein the maximum power of a sample in a given OFDM transmit symbol is large in proportion to the average power of said symbol. This indicates that a power amplifier using the OFDM waveform is relatively inefficient, and therefore less suitable for LTE uplink channels, which has lead to the development and use of alternative lower PAPR waveforms.

SUMMARY

According to one aspect of the present disclosure, there is provided a communication method comprising: producing a single carrier offset quadrature amplitude modulation (OQAM) waveform signal from a set of K complex symbols; pulse shaping 2K frequency domain samples of the OQAM waveform signal with J non-zero coefficients, where the J non-zero coefficients represent a frequency response of a conjugate symmetrical pulse shape, and $K \leq J \leq 2K-1$; and outputting the single carrier OQAM waveform signal.

Optionally, producing the single carrier OQAM waveform signal comprises: producing a set of 2K outputs that include K real components and K imaginary components from the K complex symbols; performing a Fourier transform operation on the 2K outputs to produce the 2K frequency domain samples for pulse shaping; and performing an inverse Fourier transform operation on pulse shaped frequency domain samples to produce the single carrier OQAM waveform signal.

Optionally, pulse shaping the 2K frequency domain samples of the OQAM waveform signal with the J non-zero coefficients comprises multiplying each J of the 2K frequency domain samples with a respective one of the J non-zero coefficients.

Optionally, the J of the 2K frequency domain samples are centered on a K+1-th Fourier transform output in a case where the 2K Fourier transform outputs are not cyclically shifted.

Optionally, the J of the 2K frequency domain samples are centered on a 1st Fourier transform output in a case where the 2K Fourier transform outputs are cyclically shifted by K.

Optionally, the J non-zero coefficients represent non-zero frequency components of a real Nyquist pulse.

Optionally, the J non-zero coefficients represent non-zero frequency components of a root raised cosine pulse.

Optionally, the method further comprises adaptively adjusting a value of J to achieve a target peak to average power ratio.

Optionally, producing the single carrier OQAM waveform signal comprises: performing a Fourier transform operation on the K complex symbols to produce K frequency domain samples; producing, from the K frequency domain samples, a set of 2K frequency domain samples for pulse shaping; and performing an inverse Fourier transform operation on pulse shaped frequency domain samples to produce the single carrier OQAM waveform signal.

Optionally, J is odd.

According to one aspect of the present disclosure, there is provided an apparatus comprising: a processor and memory configured to perform the following steps: producing a single carrier offset quadrature amplitude modulation (OQAM) waveform signal from a set of K complex symbols; pulse shaping 2K frequency domain samples of the OQAM waveform signal with J non-zero coefficients, where the J non-zero coefficients represent a frequency response of a conjugate symmetrical pulse shape, and $K \leq J \leq 2K-1$; and outputting the single carrier OQAM waveform signal.

Optionally, the apparatus is configured to produce the single carrier OQAM waveform signal by: producing a set of 2K outputs that include K real components and K imaginary components from the K complex symbols; performing a Fourier transform operation on the 2K outputs to produce the 2K frequency domain samples for pulse shaping; and performing an inverse Fourier transform operation on pulse shaped frequency domain samples to produce the single carrier OQAM waveform signal.

Optionally, the apparatus is configured to perform pulse shaping the 2K frequency domain samples of the OQAM waveform signal with the J non-zero coefficients by multiplying each J of the 2K frequency domain samples with a respective one of the J non-zero coefficients.

Optionally, the J of the 2K frequency domain samples are centered on a K+1-th Fourier transform output in a case where the 2K Fourier transform outputs are not cyclically shifted.

Optionally, the J of the 2K frequency domain samples are centered on a 1st Fourier transform output in a case where the 2K Fourier transform outputs are cyclically shifted by K.

Optionally, the J non-zero coefficients represent non-zero frequency components of a real Nyquist pulse.

Optionally, the J non-zero coefficients represent non-zero frequency components of a root raised cosine pulse.

Optionally, the apparatus is further configured to adaptively adjust a value of J to achieve a target peak to average power ratio.

Optionally, the apparatus is further configured to produce the single carrier OQAM waveform signal by: performing a Fourier transform operation on the K complex symbols to produce K frequency domain samples; producing, from the K frequency domain samples, a set of 2K frequency domain samples for pulse shaping; and performing an inverse Fourier transform operation on pulse shaped frequency domain samples to produce the single carrier OQAM waveform signal.

Optionally, J is odd.

According to one aspect of the present disclosure, there is provided a non-transitory computer readable medium having computer executable instructions stored thereon that when executed cause a computer to perform a method comprising: producing a single carrier offset quadrature amplitude modulation (OQAM) waveform signal from a set of K complex symbols; pulse shaping 2K frequency domain samples of the OQAM waveform signal with J non-zero coefficients, where the J non-zero coefficients represent a frequency response of a conjugate symmetrical pulse shape, and $K \le J \le 2K-1$; and outputting the single carrier OQAM waveform signal.

BRIEF DESCRIPTION OF THE DRAWINGS

Embodiments of the disclosure will now be described with reference to the attached drawings in which:

FIG. 1: is a block diagram of an example of the FDSS technique applied to a π/2-BPSK DFT-s-OFDM waveform in the transmitter of a communication device;

FIG. 2A: is a block diagram of a system for generating a low PAPR waveform in accordance with an embodiment of the disclosure;

FIG. 3: is a block diagram another system for generating a low PAPR waveform in accordance with an embodiment of the disclosure;

FIG. 4: is a block diagram of a receiver for receiving a low PAPR waveform generated by the transmitter of FIG. 3 in accordance with an embodiment of the disclosure;

DETAILED DESCRIPTION

Figure 2B:
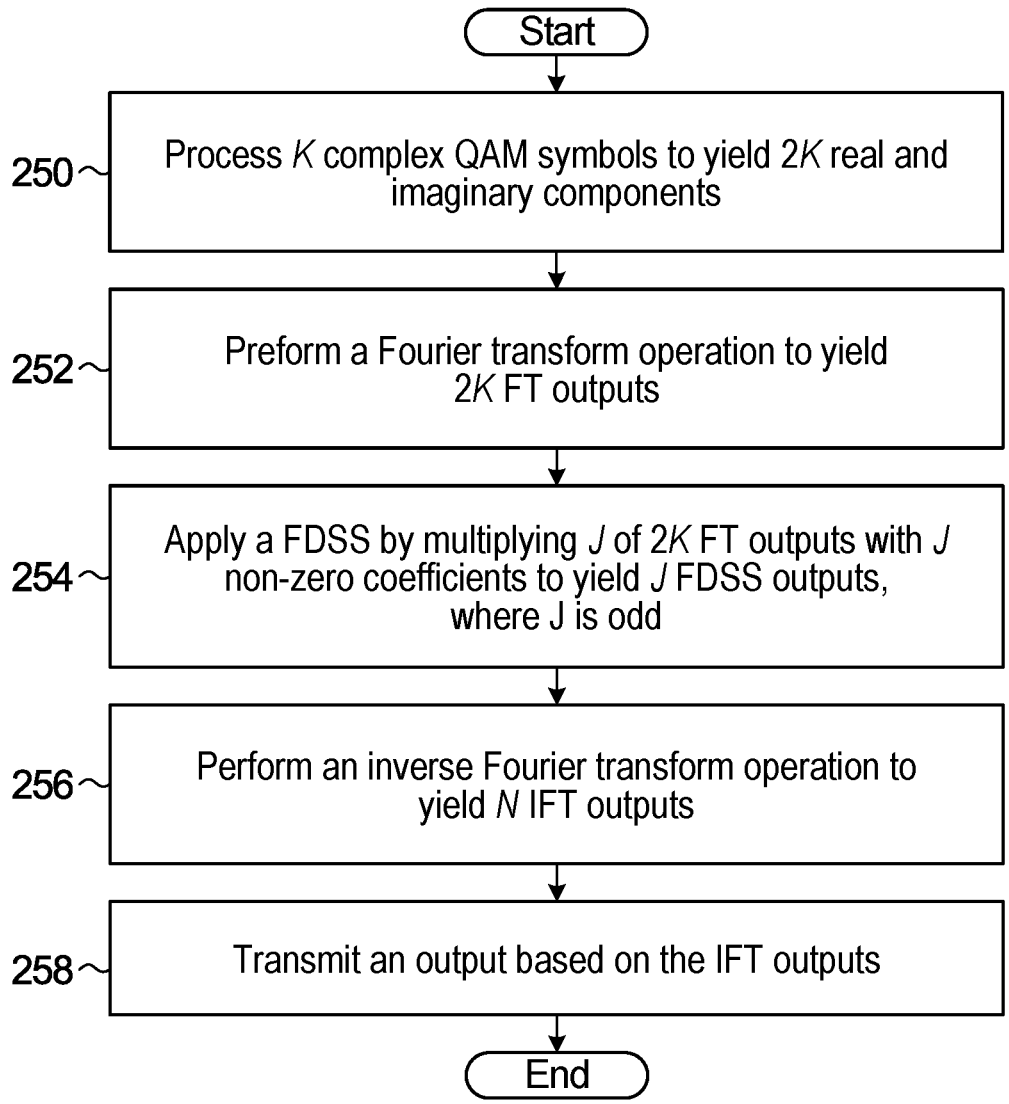
FIG. 2B: is a flowchart of a method for system for generating a low PAPR waveform in accordance with an embodiment of the disclosure.

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

A discrete Fourier transform spread orthogonal frequency division multiplexing (DFT-s-OFDM) waveform may be used in an effort to increase the power amplifier's efficiency over the OFDM waveform. Other techniques may be used in conjunction with such a waveform to further reduce the PAPR of the uplink channel. One such method is through the application of Frequency Domain Spectrum Shaping (FDSS), which changes the typical sinc pulse produced by the DFT-s-OFDM waveform into one with a lower PAPR.

FIG. 1 illustrates an example transmitter where FDSS has been applied to a π/2-binary phase shift keying (BPSK) DFT-s-OFDM waveform in the communication channel's uplink. K symbols are input to a pre-processor 102, where the output is 2K symbols. The 2K symbols then undergo a discrete Fourier transform (DFT) 104 which produces 2K outputs. At least some of the 2K outputs may be repeated in the repeater 106 to produce $J \ge 2K$ outputs. The J outputs are shaped by FDSS block 108 which produces J outputs. Within the FDSS block 108, the J data outputs are multiplied by J non-zero FDSS coefficients. The J length output is then fed to an N-inverse discrete Fourier Transform (IDFT) block 112 and then transmitted after parallel to serial (P/S) conversion 112.

One implementation of the FDSS shown in FIG. 1 is enhanced rotated QPSK. This implementation sets the number of non-zero FDSS coefficients to be J=2K, and thus the width of the pulse shape of the FDSS is even. Setting the value of J to be 2K ensures that there is no undesired bandwidth expansion.

While the PAPR of the DFT-s-OFDM waveform is reduced with the use of enhanced rotated QPSK FDSS, its implementation creates additional limitations on the input waveform. Although this technique is named after QPSK, it actually employs a BPSK constellation; therefore, enhanced rotated QPSK FDSS has the same spectral efficiency as BPSK modulation.

Only the BPSK constellation is suitable for enhanced rotated QPSK FDSS and higher order modulations (such as m-ary QAM) are not appropriate because these constellations or modulation schemes would require a larger number of FDSS coefficients J, where J>2K, resulting in unacceptable bandwidth expansion. Otherwise, implementing a higher order modulation with a smaller number of FDSS coefficients without bandwidth expansion would result in a loss of orthogonality. Likewise, the block error rate (BLER) performance of a higher order modulation implementation would degrade due to self-interference caused by the loss of orthogonality when using an enhanced rotated QPSK FDSS pulse with J=2K.

FIG. 2A is a block diagram of a transmitter provided by an embodiment of the disclosure. The transmitter 200 has a QAM symbol processor block 202 that receives K complex QAM symbols 201. The QAM symbol processor block 202 processes the K complex symbols 201 to produce 2K processor outputs 203. The 2K processor outputs 203, are input to a Fourier Transform (FT) block 204 (such as an FFT or DFT), which produces 2K FT outputs. A subset 205 containing J of the 2K outputs from the FT block 204, where $K \le J \le 2K-1$, and J is odd, is input to a Frequency Domain Spectral Shaping (FDSS) block 206, yielding J FDSS outputs 207. The J FDSS outputs 207 are input to an Inverse Fourier transform (IFT) block 208 (such as an IFFT or IDFT), resulting in N IFT outputs 209, where $N \ge J$, which are then output from the transmitter device. In some embodiments, the outputs may be from a modem. Optionally, the output may be transmitted by an antenna, possibly after being processed by further components not shown (for example parallel to serial conversion).

In operation, the K complex QAM symbols are input into the QAM symbol processor block 202. The QAM symbols may be from a QAM constellation of any order. In some embodiments, the QAM constellation is QPSK, 16QAM, 64QAM, although higher order constellations may also be used. K may be an even or odd number, and K>2. In some embodiments, K is an integer multiple of the number of tones in a resource block (RB). For example, where an RB contains 12 tones, K may be 12, 24, 36, etc. The processor block 202 produces the 2K outputs by separating the K QAM symbols 201 into their respective real and imaginary components, and the components are arranged in a sequence of each consecutive symbol's real component followed by its imaginary component from the first to the Kth symbol.

The FT block 204 applies a 2K Fourier transform operation to the 2K symbols 203, producing the 2K-FT outputs. Following the FT operation, a subset containing J of the 2K-FT outputs 205 is input into the FDSS block 206. In instances where the value of K is odd, $K \leq J \leq 2K-1$; alternatively, K may be an even value, in which case $K+1 \leq J \leq 2K-1$ since J must be odd. The value of J is dependent on the pulse shape of the FDSS.

The output of the Fourier transform operation may be cyclically shifted in some implementations. Cyclic shifting is described in further detail below. More specifically, where the Fourier transform operation is a 2K DFT. The J of the 2K FT outputs 205 are centered on the K+1-th FT output in an implementation where an output of the Fourier transform operation is not cyclically shifted. The 2K FT outputs 205 are centered on the first FT output in an implementation where the 2K FT outputs are cyclically shifted by K.

The FDSS block 206 multiplies each of the J of 2K DFT outputs 205 with a respective one of J non-zero coefficients representing the frequency response of a conjugate symmetrical pulse shape. In this manner, the frequency domain pulse shaper 206 produces the J FDSS outputs 207.

The J FDSS outputs 207 are input to the inverse Fourier Transform block 208. In some embodiments, the inverse Fourier Transform block 208 is an inverse discrete Fourier transform block with N inputs (N-IDFT). Typically, not all of the inputs are available for useful data. Some may be reserved for guardbands for example. The number of useful subcarriers is referred to herein as $N_{useful}$. In this case, the value of J is less than or equal to $N_{useful}$. The inverse Fourier Transform block 208 produces N IFT outputs 209 (which again can be from a modem), which are then output from the transmitter device and optionally transmitted using an antenna. In practice, the value J is less than or equal to $N_{useful}$, such that other inputs can also be processed by the inverse Fourier Transform block. Specifically, $N_{useful}-J$ other N-IDFT inputs can be processed by the N-IDFT in parallel to inputs related to the single transmitter chain described above.

FIG. 2B: is a flowchart of a method for system for generating a low PAPR waveform in accordance with an embodiment of the disclosure. The method may, for example, be implemented using the transmitter of FIG. 2A. The method begins with block 250 with processing a set of K complex QAM symbols by separating the K complex QAM symbols into K real components and K imaginary components to produce a set of 2K outputs containing in sequence the real component of the first symbol, the imaginary component of the first symbol, the real component of the second symbol, the imaginary component of the second symbol, ..., the real component of the Kth symbol, the imaginary component of the Kth symbol, where K>=2. The method continues in block 252 with performing a Fourier Transform operation on the 2K outputs to produce 2K Fourier transform outputs. The method continues in block 254 with performing frequency domain spectral shaping (FDSS) by multiplying each of J of the 2K Fourier transform outputs with a respective one of J non-zero coefficients, wherein the J non-zero coefficients represent a frequency response of a conjugate symmetrical pulse shape, to produce J FDSS outputs, where J is odd, and $K \leq J \leq 2K-1$. J of the 2K Fourier transform outputs are centered on the K+1-th Fourier transform output in a case where an output of the Fourier Transform operation is not cyclically shifted or the J of the 2K Fourier transform outputs are centered on the 1st Fourier transform output in a case the 2K Fourier transform outputs are cyclically shifted by K. The method continues in block 256 with processing the J FDSS outputs with an inverse Fourier Transform operation to produce N inverse Fourier transform outputs. Finally, in block 258, an output based on the N Fourier Transform outputs is outputted or transmitted.

Advantageously, compared to the approach of FIG. 1, the approach of FIGS. 2A and 2B does not have self-interference with the result that better BLER performance may be possible. For the same reason, the provided method and system is applicable to any modulation order and without bandwidth expansion, whereas FIG. 1 is typically limited to the enhanced rotated QPSK implementation, with the resulting BSPK spectral efficiency. The provided system and method have the flexibility to use $K \leq J \leq 2K-1$ FDSS lengths (J=K only holds when K is odd). This creates the flexibility to implement a design that can trade-off between PAPR vs spectrum efficiency. For example, if a QPSK constellation is employed and J=K (K must be odd), the result is poorer (larger) PAPR but better spectral efficiency than a design having J>K. Furthermore, this specific design of J=K would still have the advantage of exhibiting the same spectral efficiency as QPSK DFT-s-OFDM, yet with lower PAPR than QPSK DFT-s-OFDM.

The output of the provided system and method is a circular convolved single carrier offset QAM (OQAM) waveform. This has a real domain orthogonality condition and thus avoids self-interference. Further, a range of pulse shapes with different spectrum efficiencies can be used.

Referring now to FIG. 3, shown is an example of a more detailed implementation of the transmitter of FIG. 2A. The transmitter of FIG. 3 differs from that of FIG. 2A in that the Fourier Transform 204 of FIG. 2A is specified to be a discrete Fourier Transform 304 (such as an FFT); the inverse Fourier transform 208 of FIG. 2A is specified to be an N-IDFT 308 (an inverse discrete Fourier Transform having N inputs, such as an N-IFFT), and shown are further processing elements that include a parallel to serial converter 312 and a cyclic prefix (CP) inserter 314.

The processor 202 takes K QAM symbols from any constellation (e.g. QPSK, 16QAM, 64QAM, etc.) and separates them to real and imaginary components. K can be odd or even number. The result is a set of outputs that include 2K real and imaginary symbols. Let $a_1+ib_1, a_2+ib_2, \ldots, a_K+ib_K$ be the parallel K number of QAM symbols, then 2K parallel outputs can be expressed as $a_1, ib_1, a_2, ib_2, \ldots, a_K, ib_K$.

The DFT 304 takes the 2K inputs $a_1, ib_1, a_2, ib_2, \ldots, a_K, ib_K$ and performs a 2K-DFT. There are two well-known ways to index 2K-DFT output: First $\bar{s}_1, \bar{s}_2, \ldots, \bar{s}_{2K}$ and second is $\bar{s}_0, \bar{s}_1, \ldots, \bar{s}_{2K-1}$. Only j out of 2K will be subject to further processing as detailed below.

As mentioned, J is always an odd number. If K is odd then $K \leq J \leq 2K-1$. If K is even then $K+1 \leq J \leq 2K-1$. The value of j depends on the pulse shape. The FDSS coefficients $f_1, f_2, \ldots, f_J$ represent non-zero frequency components of a conjugate symmetrical pulse. In some embodiments the coefficients represent a real Nyquist pulse.

A root raised cosine (RRC) is an example of a pulse that can be used. Let $F(\omega)$ be the frequency response of RRC. By definition $F(\omega)$ is zero for $\omega \geq (1+\beta)/2T$ where $1/T$ is the Nyquist rate. All J non zero samples of $F(\omega)$; these samples are used as the FDSS coefficients. In this case $f_{J+1/2} = F(0)$.

First Indexing Method

In some embodiments, the first indexing method ($\bar{s}_1, \bar{s}_2, \ldots, \bar{s}_{2K}$) is used. In this situation, there are two ways to perform FDSS.

In a first approach, J FDSS outputs are given by:

$$d_1, d_2, \ldots, d_J = f_1 \bar{s}_{K-\frac{J-1}{2}+1}, f_2 \bar{s}_{K-\frac{J-1}{2}+2}, \ldots, f_{\frac{J+1}{2}} \bar{s}_{K+1}, \ldots, f_J \bar{s}_{K+\frac{J+1}{2}},$$

where the center is $\bar{s}_{K+1}$.

In a second approach, the 2K-DFT outputs are cyclically shifted by K but the pulse coefficients are kept as is. In this case, J FDSS outputs can be found by cyclic shifting 2K-DFT output by K, which are given by:

$$d_1, d_2, \ldots, d_J = f_1 \bar{s}_{2K-\frac{J-1}{2}+1}, f_2 \bar{s}_{2K-\frac{J-1}{2}+2},$$

$$\ldots, f_{\frac{J-1}{2}} \bar{s}_{2K}, f_{\frac{J+1}{2}} \bar{s}_1, f_{\frac{J+1}{2}+1} \bar{s}_2, \ldots, f_J \bar{s}_{\frac{J+1}{2}},$$

where the center is $\bar{s}_1$.

This can be understood by assuming $\bar{s}_1, \bar{s}_2, \ldots, \bar{s}_{2K}$ are arranged in a circle where in the first approach $\bar{s}_{K+1}$ as the center and in the second approach, $\bar{s}_1$ as the center.

Second Indexing Method

In some embodiments, the second indexing method ($\bar{s}_0, \bar{s}_1, \ldots \bar{s}_{2K-1}$) is used. Two equivalent approaches are available. In the first approach, the J FDSS outputs are given by:

$$d_1, d_2, \ldots, d_J = f_1 \bar{s}_{K-\frac{J-1}{2}}, f_2 \bar{s}_{K-\frac{J-1}{2}+1}, \ldots, f_{\frac{J+1}{2}} \bar{s}_K, \ldots, f_J \bar{s}_{K+\frac{J+1}{2}-1},$$

where the center is $\bar{s}_K$.

In the second approach, the J FDSS outputs can be found by cyclic shifting 2K-DFT output by K, which are given by:

$$d_1, d_2, \ldots, d_J = f_1 \bar{s}_{2K-\frac{J-1}{2}}, f_2 \bar{s}_{2K-\frac{J-1}{2}+1}, \ldots,$$

$$f_{\frac{J-1}{2}} \bar{s}_{2K-1}, f_{\frac{J+1}{2}} \bar{s}_0, f_{\frac{J+1}{2}+1} \bar{s}_1, \ldots, f_J \bar{s}_{\frac{J+1}{2}-1},$$

where the center is $\bar{s}_0$.

Receiver

In the following description of the receiver, the first indexing $\bar{s}_1, \bar{s}_2, \ldots, \bar{s}_{2K}$ is used, but a similar approach can be employed for a case where the second indexing is used.

FIG. 4 is a block diagram of a receiver provided by an embodiment of the disclosure suitable for use with the transmitter of FIG. 3. Shown are the following blocks connected together in sequence: CP remover block 400, serial to parallel converter 402, N-DFT 404, equalizer 406, FDSS block 408, 2K-IDFT block 410, and post-processor 412. These functional blocks perform the inverse of the operations described for the transmitter. Only the relevant j frequency components are taken from the output of the N-DFT 404. Note this receiver employs one tap equalization.

The FDSS block 408 takes J outputs from the N-DFT 404 and multiplies the J outputs with J non-zero coefficient $f_1^*, f_2^*, \ldots, f_J^*$. These coefficients are the complex conjugates of $f_1, f_2, \ldots, f_J$ used in the transmitter. As the pulse is real and even symmetrical, the frequency response is real and even symmetrical. Thus, $f_j^* = f_j$. Note that de-mapping from N to J performed in the receiver corresponds with the mapping of J to N in the transmitter.

The output $\tilde{s}_1, \tilde{s}_2, \ldots, \tilde{s}_J$ of the FDSS block 408 is zero padded from both sides to form a 2K vector, which is used as the input of 2K-IDFT 410. Let the output be $\tilde{a}_1 + i\tilde{a}_1, i\tilde{b}_1 + i\tilde{b}_1, \tilde{a}_2 + i\tilde{a}_2, i\tilde{b}_2 + i\tilde{b}_2, \ldots, \tilde{a}_K + i\tilde{a}_K, \tilde{b}_K + i\tilde{b}_K$. In here, $i\tilde{a}_k$ is the imaginary interference to real signal $\tilde{a}_k$ and similarly $\tilde{b}_k$ is real interference to imaginary signal $i\tilde{b}_k$.

The post-processor 412 takes the 2K inputs $\tilde{a}_1 + i\tilde{a}_1, \tilde{b}_1 + i\tilde{b}_1, \tilde{a}_2 + i\tilde{a}_2, \tilde{b}_2 + i\tilde{b}_2, \ldots, \tilde{a}_K + i\tilde{a}_K, i\tilde{b}_K + i\tilde{b}_K$ as input and outputs K QAM symbols $\tilde{a}_1 + i\tilde{b}_1, \tilde{a}_2 + i\tilde{b}_2, \ldots, \tilde{a}_K + i\tilde{b}_K$ by combining the real and imaginary values into complex values. These are the received QAM symbols which may then be subject to further processing. The imaginary interference to the real signal and the real interference to the imaginary signal are removed in the post-processor 412.

Figure 5:
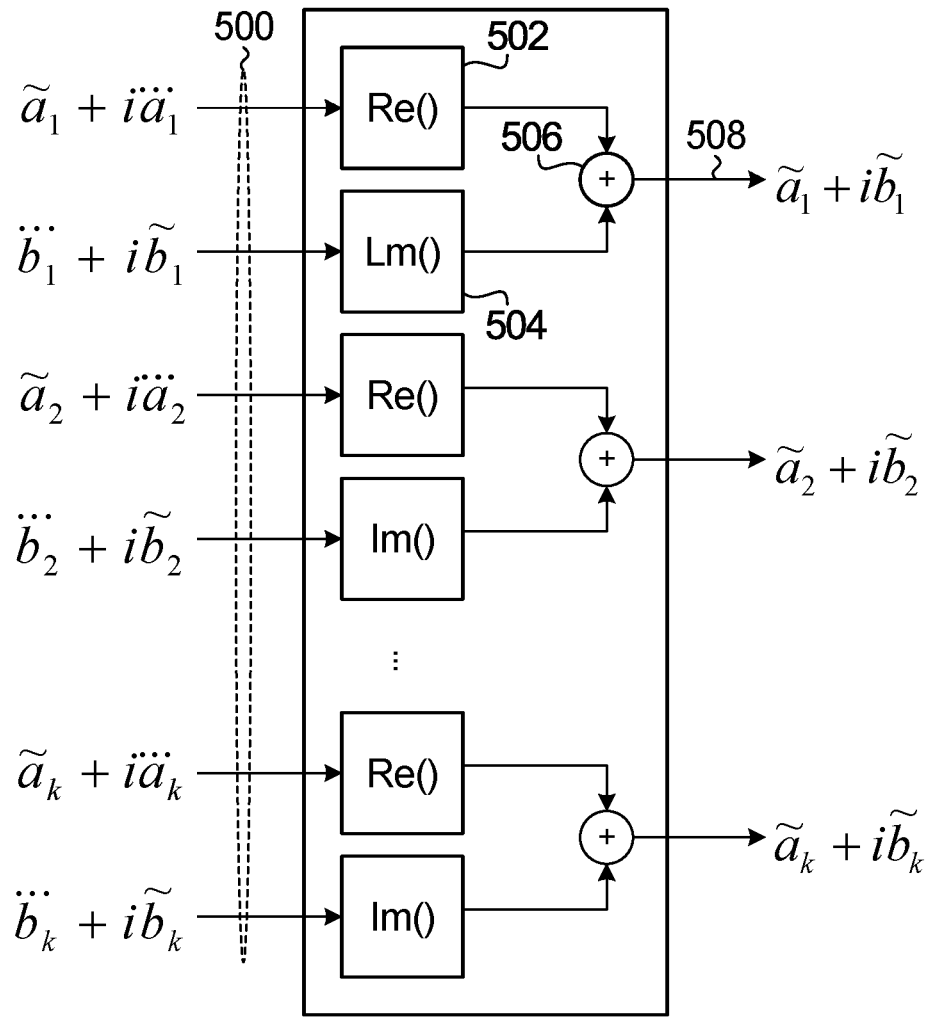
FIG. 5: is a block diagram of an example implementation of a post-processor for use within the receiver shown in FIG. 4 in accordance with an embodiment of the disclosure.

FIG. 5 is a block diagram of an example implementation of the post-processor which processes the 2K inputs. The functionality for processing the first two inputs $\tilde{a}_1 + i\tilde{a}_1, \tilde{b}_1 + i\tilde{b}_1$ will be described by way of example. The first input $\tilde{a}_1 + i\tilde{a}_1$, is input to a Re( ) operator 502 which takes a complex input and outputs the real part of that complex input. The second input $\tilde{b}_1 + i\tilde{b}_1$ is input to a Im( ) operator 504 which takes a complex input and outputs the imaginary part of that complex input. The outputs of the Re( ) operator 502 and the Im( ) operator 504 are combined in adder 506 to produce the output $\tilde{a}_1 + i\tilde{b}_1$ 508.

Figure 6:
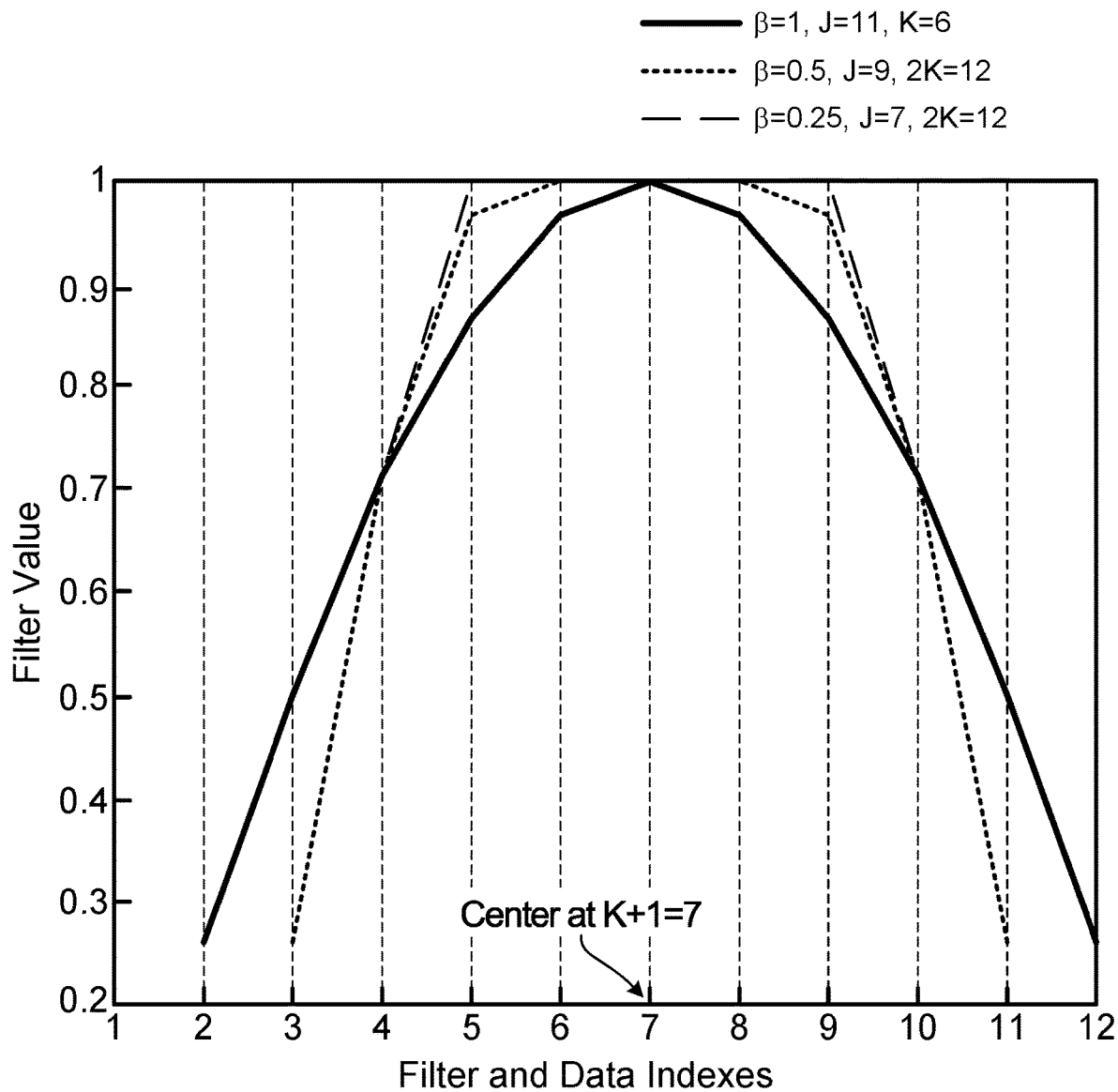
FIG. 6: is a plot exemplifying the relationship between the filter and data indices of several RRC pulses with respect to their filter values, $f_j$, for use within the FDSS operation of the transmitter shown in FIG. 3.

FIG. 6 shows several examples of different RRC pulses that may be used in the FDSS block. Shown are examples where K=6, and where J=11, 9, or 7. In each case, the pulse is centered at K+1=7. Note the pulse shape has an effect on PAPR.

In the described embodiments, the FDSS length is odd and conjugate symmetrical such that the pulse is real in time domain. In some embodiments, the pulse is a Nyquist pulse. This above fact together with the specific way that the pulse is centered on the data output by the DFT generates a circular convolved single carrier OQAM signal with real domain orthogonality. As such, there is no loss of orthogonality, contrary to the case described with reference to FIG. 1. In addition, since there is real domain orthogonality, the provided system and method do not have self-interference, and therefore can be applicable to any QAM modulation order.

As a further advantage, use of excessive bandwidth is not needed. $K \leq J \leq 2K-1$ subcarriers are allocated to transmit the K QAM symbols in comparison to enhanced rotated QPSK described with reference to FIG. 1, which uses j=2K subcarriers. Therefore, the provided system and method provides an efficient tradeoff between PAPR and spectrum efficiency in comparison to DFT-s-OFDM. Furthermore, when J=K, the spectral efficiency is the same as DFT-s-OFDM but with lower PAPR.

Figure 7:
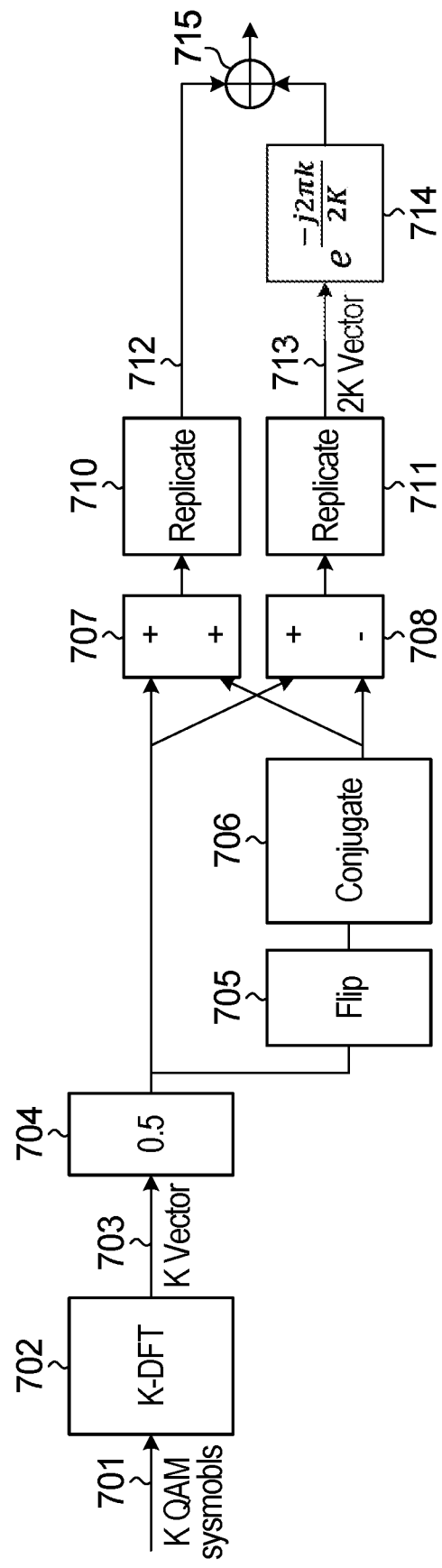
FIG. 7: is a block diagram exemplifying alternative operations that may be used in place of the processor and 2K-DFT blocks within the transmitter of FIG. 3 in accordance with an embodiment of the invention.

The QAM symbol processor and 2K-DFT can be replaced with a K-DFT and further operations. This may be accomplished because the data signals are either real or imaginary. FIG. 7 is a block diagram of functional elements that can be used to replace the processor and 2K-DFT in the transmitter diagram.

Like the processor shown in the transmitter block diagram in FIG. 3, K QAM symbols 701 are used as an initial input.

In this embodiment, the K symbols 701 are first input to a K-DFT block 702. The K-DFT block 702 produces a vector of length K 703, which is then input into multiplication block with a multiplication factor of 0.5 704. The resulting product is then used as the input to a flip operation block 705 and as a positive valued input into summation blocks 707 and 708. The output of the flip operation block is input to a conjugate block 706, wherein the resultant output is used as an input to summation block 707 as a positive value and summation block 708 as a negative value. The sums yielded by summation blocks 707 and 708 are then input into replication operation blocks 710 and 711, each producing a vector of length 2K 712-713. One of the vectors 713 is input to a multiplication block 714, wherein the vector 713 is multiplied by a factor of $$e^{-\frac{j\pi k}{2K}}.$$

The output yielded from block 714 and the vector of length 2K 712 produced by replication operation block 710 are added together at summation node 715. The output of the summation node 216 may then enter a FDSS and be processed through the remaining blocks as described previously with reference to FIG. 3.

In the above block diagram, the flip operation reverses the order of the vector. The conjugate block outputs the conjugate of the input vector. The replicate operations replicate the K length vector twice to obtain 2K length vector. The multiply operation 714 multiplies the k−1-th element by $$e^{-\frac{j\pi k}{2K}}$$

factor, for each value of k from 1 to 2K. The complexity of this approach is K (log K+C) where C is a constant while 2K-FFT has a complexity of 2K log 2K.

An advantage of using the approach of FIG. 7 is that by replacing 2K-DFT with K-DFT, complexity overhead can be reduced. DFT-s-OFDM uses K-DFT, thus this approach matches the same complexity order as DFT-s-OFDM.

In some embodiments, for any of the embodiments described herein, the number of j subcarriers is adjusted adaptively. This may be done with a fixed periodicity, or when certain trigger conditions are met. J can be adjusted adaptively based on any suitable metric. In a specific example, J is adjusted to achieve a desired PAPR. Changing J will necessarily change the pulse shape used in the FDSS operations.

Recall that K≤J≤2K−1 is a subset of the 2K Fourier outputs, and j is equal to the number of non-zero coefficients in the FDSS pulse shape. In some embodiments, the adjusted number of J subcarriers has a fixed relationship with the size of the QAM constellation (i.e., the modulation order), such that by updating the QAM constellation size, the value of J is updated accordingly to corresponding value for the new QAM constellation size. The QAM constellation size may be adaptively adjusted on some basis, and then the value of J that is used is tied to that constellation size. An inversely proportional relationship exists between the QAM constellation size of a given input and its resultant PAPR.

Furthermore, the number of J subcarriers required to achieve a target PAPR may be determined based on characteristics of a known FDSS pulse shape. For instance, there exists an inversely proportional relationship between the spread of an RRC pulse and its PAPR. Likewise, there exists a proportional relationship between the spread of an RRC pulse and a number of J subcarriers.

In some embodiments, K>=6. In some embodiments, as noted above, K is a multiple of the RB size. In some embodiments, J is an integer multiple of the RB size minus 1. So for an RB size of 12, J may be an integer multiple of 12 minus 1, as J needs to be an odd number. E.g., 11,23,35, etc.

Figure 8:
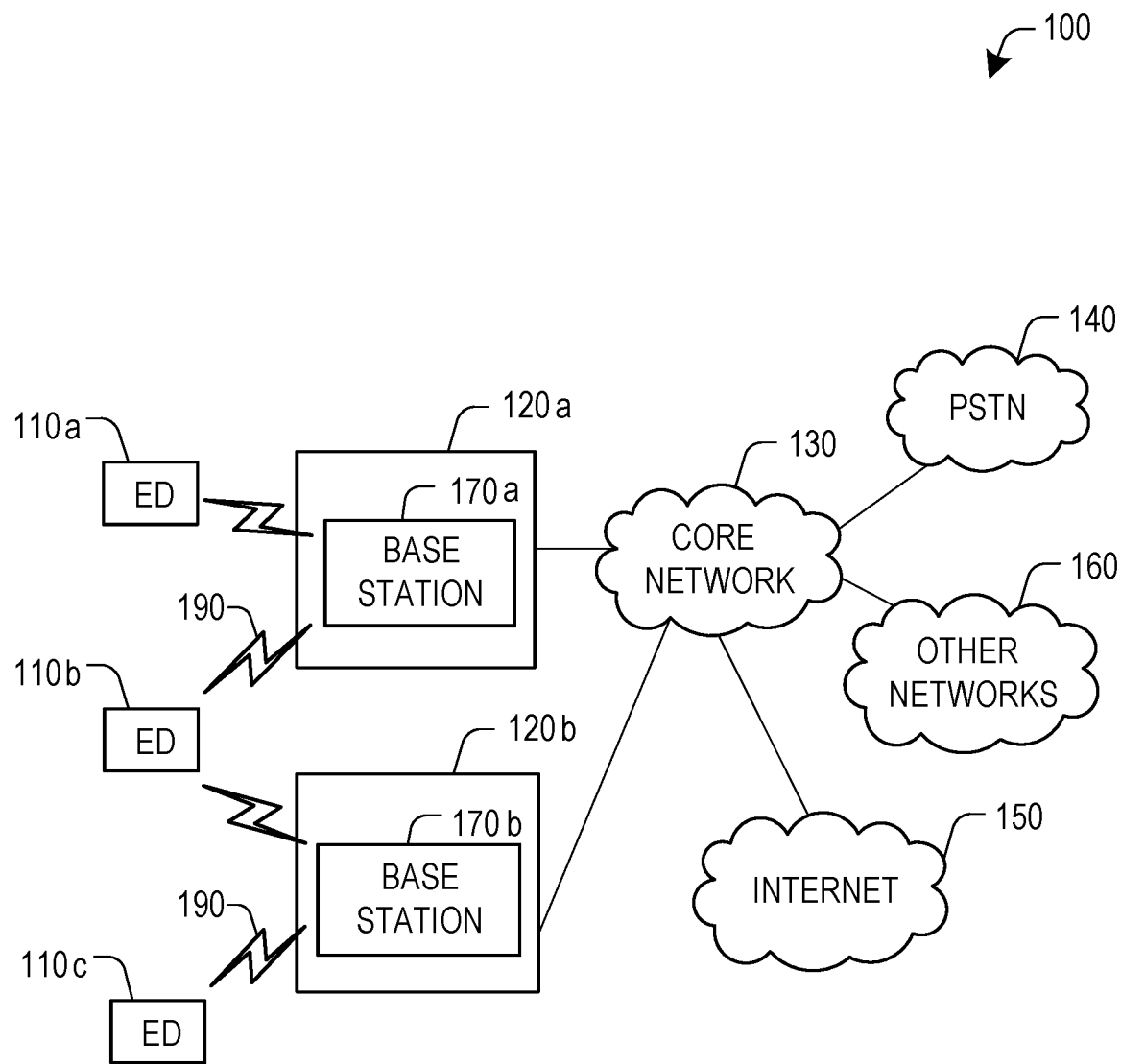
FIG. 8 is a network diagram of a communication system.

FIG. 8 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 8, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 8, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170*b* forms part of the RAN 120*b*, which may include other base stations, elements, and/or devices. Each base station 170*a*-170*b* transmits and/or receives wireless signals within a particular geographic region or area, sometimes referred to as a "cell" or "coverage area". A cell may be further divided into cell sectors, and a base station 170*a*-170*b* may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120*a*-120*b* shown is exemplary only. Any number of RAN may be contemplated when devising the communication system 100.

The base stations 170*a*-170*b* communicate with one or more of the EDs 110*a*-110*c* over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170*a*-170*b* may implement Universal Mobile Telecommunication System (UMTS) Terrestrial Radio Access (UTRA) to establish an air interface 190 using wideband CDMA (WCDMA). In doing so, the base station 170*a*-170*b* may implement protocols such as HSPA, HSPA+ optionally including HSDPA, HSUPA or both. Alternatively, a base station 170*a*-170*b* may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120*a*-120*b* are in communication with the core network 130 to provide the EDs 110*a*-110*c* with various services such as voice, data, and other services. The RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the internet 150, and the other networks 160). In addition, some or all of the EDs 110*a*-110*c* may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110*a*-110*c* may be multimode devices capable of operation according to multiple radio access technologies, and incorporate multiple transceivers necessary to support such.

Figure 9A:
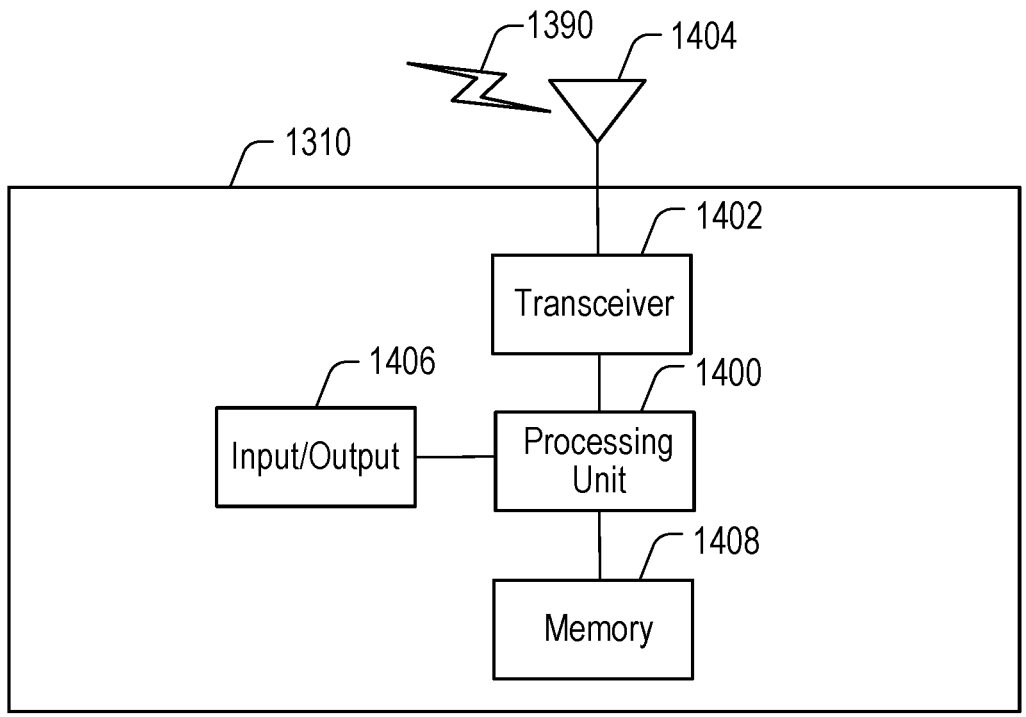
FIG. 9A is a block diagram of an example electronic device.
Figure 9B:
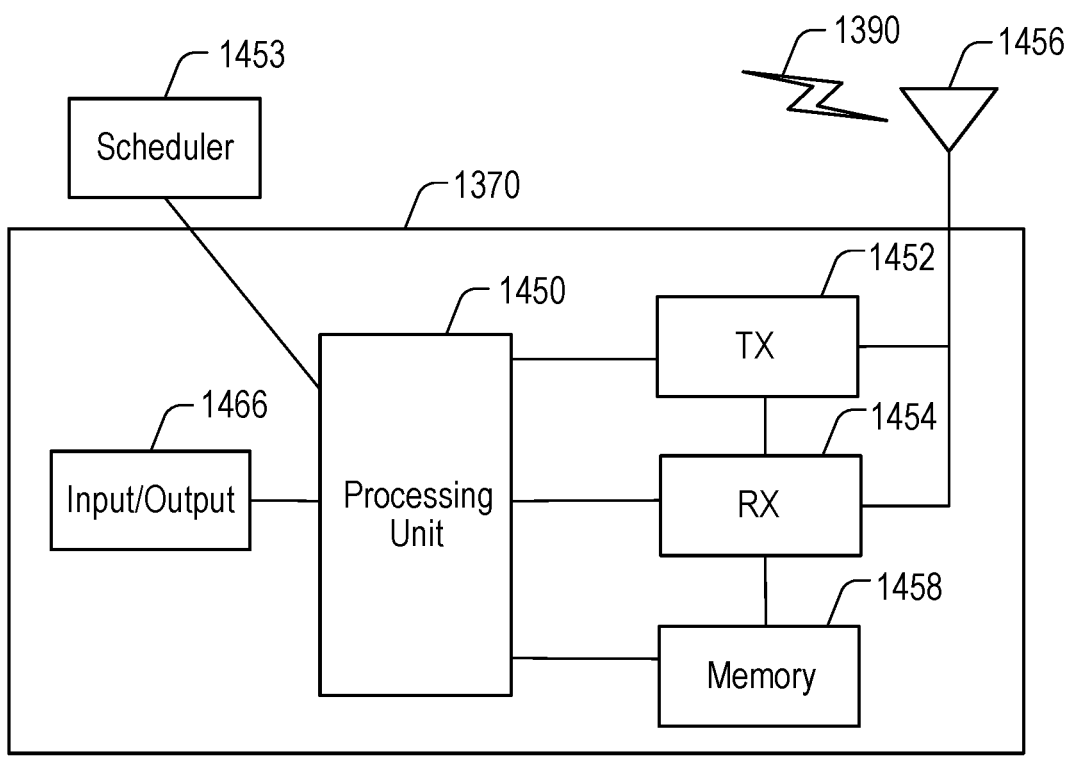
FIG. 9B is a block diagram of an example electronic device.

FIGS. 9A and 9B illustrate example devices that may implement the methods and teachings according to this disclosure. In particular, FIG. 9A illustrates an example ED 110, and FIG. 9B illustrates an example base station 170. These components could be used in the communication system 100 or in any other suitable system.

As shown in FIG. 9A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 9B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 10:
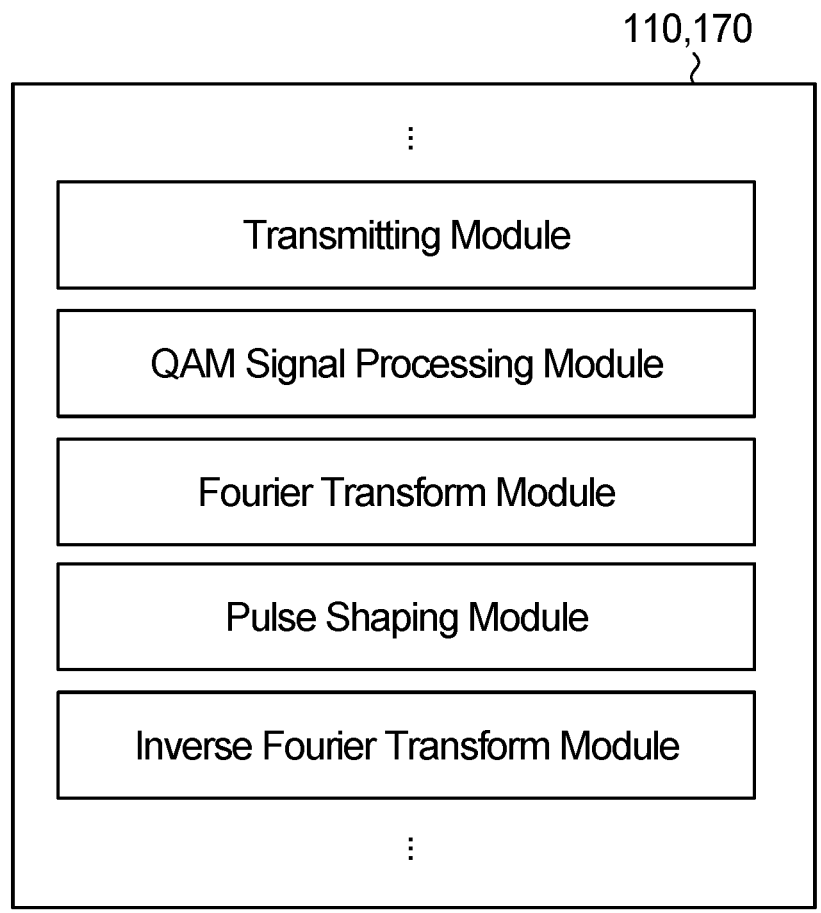
FIG. 10 is a block diagram of component modules.

It should be appreciated that one or more steps of the embodiment methods provided herein may be performed by corresponding units or modules, according to FIG. 10. For example, a signal may be transmitted by a transmitting unit or a transmitting module. A signal may be received by a receiving unit or a receiving module. A signal may be processed by a processing unit or a processing module. Other steps may be performed by:

QAM signal processing module that separates complex symbols into real and imaginary components;
Fourier Transform module;
Pulse shaping module;
Inverse Fourier Transform module.

The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

While the provided system and method have been described in the context of wireless telecommunications, they can also be used in mmWave, microwave backhaul, NTN in 6G, or even to replace the $\pi/2$-BPSK modulation in Rel-15.

Numerous modifications and variations of the present disclosure are possible in light of the above teachings. It is therefore to be understood that within the scope of the appended claims, the disclosure may be practiced otherwise than as specifically described herein.

What is claimed is:

1. A communication method comprising:
producing a single carrier offset quadrature amplitude modulation (OQAM) waveform signal from a set of K complex symbols;
pulse shaping 2K frequency domain samples of the OQAM waveform signal with J non-zero coefficients, where the J non-zero coefficients represent a frequency response of a conjugate symmetrical pulse shape, and $K \leq J \leq 2K-1$; and
outputting the single carrier OQAM waveform signal.

2. The method of claim 1, wherein producing the single carrier OQAM waveform signal comprises:
producing a set of 2K outputs that include K real components and K imaginary components from the K complex symbols;
performing a Fourier transform operation on the 2K outputs to produce the 2K frequency domain samples for pulse shaping; and
performing an inverse Fourier transform operation on pulse shaped frequency domain samples to produce the single carrier OQAM waveform signal.

3. The method of claim 1, wherein producing the single carrier OQAM waveform signal comprises:
performing a Fourier transform operation on the K complex symbols to produce K frequency domain samples;
producing, from the K frequency domain samples, a set of 2K frequency domain samples for pulse shaping; and
performing an inverse Fourier transform operation on pulse shaped frequency domain samples to produce the single carrier OQAM waveform signal.

4. The method of claim 1 wherein pulse shaping the 2K frequency domain samples of the OQAM waveform signal with the J non-zero coefficients comprises multiplying each J of the 2K frequency domain samples with a respective one of the J non-zero coefficients.

5. The method of claim 4 wherein the J of the 2K frequency domain samples are centered on a K+1-th Fourier transform output in a case where the 2K Fourier transform outputs are not cyclically shifted.

6. The method of claim 4 wherein the J of the 2K frequency domain samples are centered on a 1st Fourier transform output in a case where the 2K Fourier transform outputs are cyclically shifted by K.

7. The method of claim 1 wherein the J non-zero coefficients represent non-zero frequency components of a real Nyquist pulse.

8. The method of claim 1 wherein the J non-zero coefficients represent non-zero frequency components of a root raised cosine pulse.

9. The method of claim 1 further comprising adaptively adjusting a value of J to achieve a target peak to average power ratio.

10. The method of claim 1, wherein J is odd.

11. An apparatus comprising:
a processor and memory configured to perform the following steps:
producing a single carrier offset quadrature amplitude modulation (OQAM) waveform signal from a set of K complex symbols;
pulse shaping 2K frequency domain samples of the OQAM waveform signal with J non-zero coefficients, where the J non-zero coefficients represent a frequency response of a conjugate symmetrical pulse shape, and $K \leq J \leq 2K-1$; and
outputting the single carrier OQAM waveform signal.

12. The apparatus of claim 11, configured to produce the single carrier OQAM waveform signal by:
producing a set of 2K outputs that include K real components and K imaginary components from the K complex symbols;
performing a Fourier transform operation on the 2K outputs to produce the 2K frequency domain samples for pulse shaping; and
performing an inverse Fourier transform operation on pulse shaped frequency domain samples to produce the single carrier OQAM waveform signal.

13. The apparatus of claim 11, configured to produce the single carrier OQAM waveform signal by:
performing a Fourier transform operation on the K complex symbols to produce K frequency domain samples;
producing, from the K frequency domain samples, a set of 2K frequency domain samples for pulse shaping; and
performing an inverse Fourier transform operation on pulse shaped frequency domain samples to produce the single carrier OQAM waveform signal.

14. The apparatus of claim 11 configured to perform pulse shaping the 2K frequency domain samples of the OQAM waveform signal with the J non-zero coefficients by multiplying each J of the 2K frequency domain samples with a respective one of the J non-zero coefficients.

15. The apparatus of claim 14 wherein the J of the 2K frequency domain samples are centered on a K+1-th Fourier transform output in a case where the 2K Fourier transform outputs are not cyclically shifted.

16. The apparatus of claim 14 wherein the J of the 2K frequency domain samples are centered on a 1st Fourier transform output in a case where the 2K Fourier transform outputs are cyclically shifted by K.

17. The apparatus of claim 11 wherein the J non-zero coefficients represent non-zero frequency components of a real Nyquist pulse.

18. The apparatus of claim 11 wherein the J non-zero coefficients represent non-zero frequency components of a root raised cosine pulse.

19. The apparatus of claim 11 further configured to adaptively adjust a value of J to achieve a target peak to average power ratio.

20. The apparatus of claim 11, wherein J is odd.

21. A non-transitory computer readable medium having computer executable instructions stored thereon that when executed cause a computer to perform a method comprising:
producing a single carrier offset quadrature amplitude modulation (OQAM) waveform signal from a set of K complex symbols;
pulse shaping 2K frequency domain samples of the OQAM waveform signal with J non-zero coefficients, where the J non-zero coefficients represent a frequency response of a conjugate symmetrical pulse shape, and $K \leq J \leq 2K-1$; and
outputting the single carrier OQAM waveform signal.

* * * * *